Sept. 28, 1943.  C. W. P. HEYLANDT ET AL  2,330,583
SEALING OF ROTARY VALVES
Filed Dec. 26, 1940
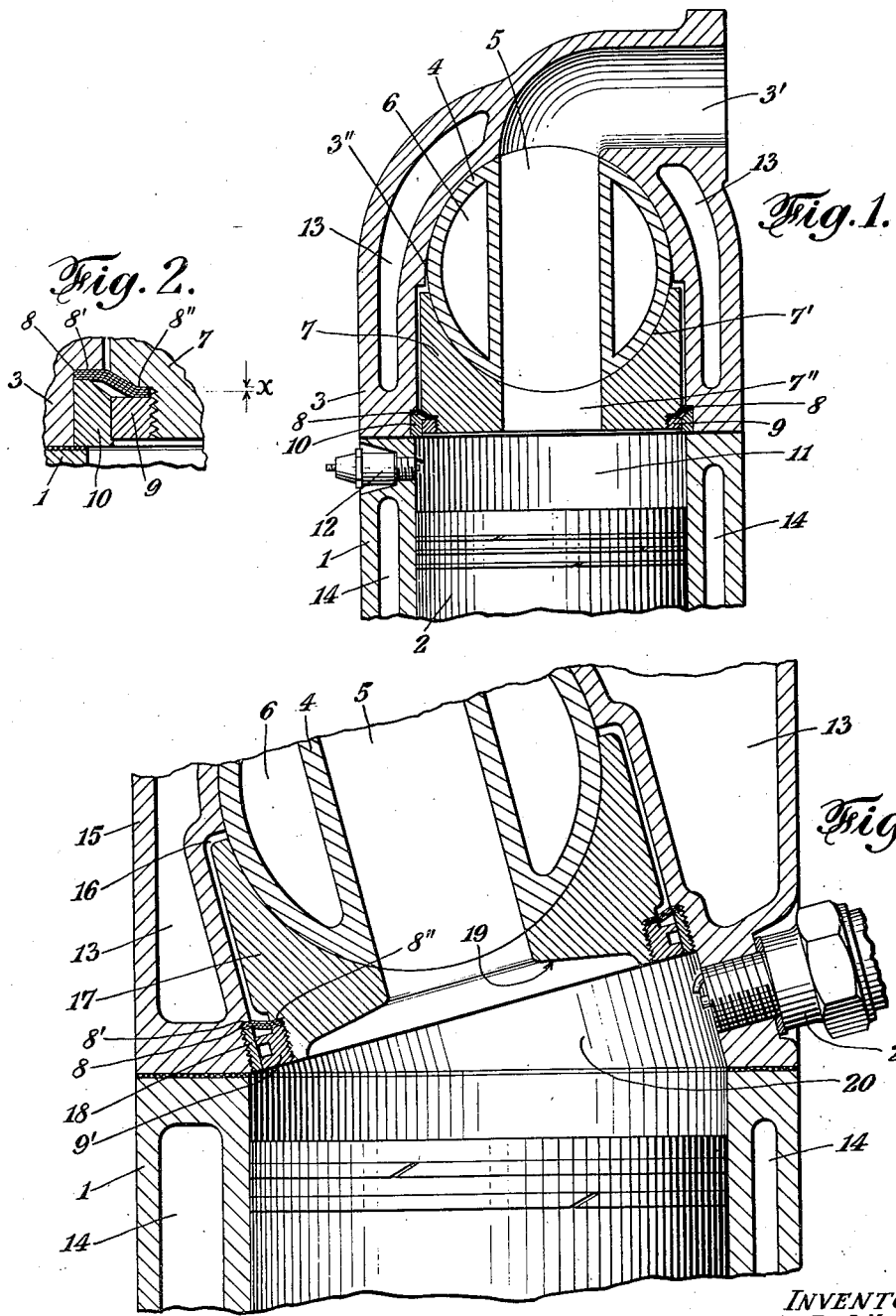
INVENTORS
Christian Wilhelm Paul Heylandt
Rudolf Mewes
Albert Pomutz
Alfred Baer
BY
their Attorney.

Patented Sept. 28, 1943

2,330,583

UNITED STATES PATENT OFFICE 2,330,583

SEALING OF ROTARY VALVES

Christian Wilhelm Paul Heylandt, Rudolf Mewes and Albert Pomutz, Berlin-Britz, and Alfred Baer, Berlin-Schmargendorf, Germany; vested in the Alien Property Custodian Application December 26, 1940, Serial No. 371,802
In Germany June 17, 1939

12 Claims. (Cl. 123—190)

This invention relates generally to sealing instrumentalities for engines equipped with rotary valves, and particularly to sealing means adapted to perform the double function of airtightly sealing the space between two structural telescoping elements, while at the same time tensionally suspending one element within, and forcing it against the other element.

The principal object of the present invention is to provide combination sealing and suspension means for an engine construction having individual engine cylinders and rotary intake and exhaust controlling valves within their detachable heads, at least one valve for each cylinder, said valves being aligned with one another and being disposed in parallel relation to the crankshaft of the engine, and being seated or journaled in a combination seat, the upper seat portion of which is stationary and located in the substantially closed top end of the cylinder head, whereas its corresponding seat portion is mobile, being arranged in a movable member, the latter being operatively mounted within and telescoping with the body of the head; and wherein said combination sealing and suspension means physically connect the movable member with the head body and simultaneously provide an airtight joint between the two head elements, thereby sealing the space between them; said combination means also serving for forcibly urging the movable member towards the fixed valve seat provided in the head top.

Another object of the present invention is to provide combination sealing and suspension means between the head and a movable member therewithin, both instrumentalities being equipped with seat portions for rotary engine control valves, and wherein said combination means constitute a substantially ring-shaped diaphragm, the inner and outer edges of which are airtightly connected with the movable member and the head body, respectively, and wherein said diaphragm is constructed and arranged to exert a yieldable pressure against the movable member for constantly urging it against the fixed upper valve seat portion, to assure an airtight contact between the valve and its seat bearings, irrespective of the dimensional changes to which the several parts are subjected in consequence of thermal fluctuations within the engine.

Still another object of this invention is to provide the aforesaid combination sealing and suspension means in the form of a plurality of superimposed, thin, smooth, ring-shaped diaphragms, the individual thickness of which diaphragms ranges between .05 to .1 per cent of the diameter of the cylinder bore, and which combined diaphragms are capable of a body movement ranging from .5 to 2 per cent of the cylinder bore, whereby the required movement, as well as the pressure of the diaphragm structure against the aforesaid movable member may be determined.

Another object of this invention is to provide a combination sealing and suspension means between a movable member and a cylinder head in the form of superimposed diaphragms, the inner and outer edges of which latter are being held in sealing contact with these two head elements by means of tightening rings, and wherein the total thickness of such diaphragms for cylinders of diameters not exceeding 100 mm. ranges from .5 to 1 mm., and for cylinders having a bore diameter not exceeding 150 mm. the total thickness of the diaphragms varies between .5 to 1.5 mm.

Another object of the present invention is to provide combination sealing and suspension means within a cylinder head for the support of a movable element within the head, and wherein the movable element and said combination sealing and suspension means completely fill the space directly above the upper edge of the cylinder, whereby the compression space for the engine cylinder is defined below the upper cylinder edge, in consequence whereof the ignition means for the cylinder are also disposed below the upper cylinder edge.

Another object of this invention is to provide combination sealing and resilient suspension means for engines with removable cylinder heads, having a rotary valve journaled partially in fixed and partially in mobile seat portions arranged, respectively, in the upper head end and in a movable element operative within a cavity provided in the head, and wherein the cavity, the movable member and the combination sealing and suspension means for the movable member are inclined relative to the upper edge of the cylinder, thereby providing, within the head body and above the upper cylinder edge, a substantially wedge-shaped compression and combustion space for the engine, and wherein the ignition means for the engine are placed into the head body and project into the widest portion of the compression space.

In devices for sealing circular spaces between two fixed and movable annuli, corrugated diaphragms often have been employed. Such diaphragms, when intended to exert pressure against one of the annuli, are very difficult to adjust, especially when their intended travel or movement is to be very short. Slightest inaccuracies in adjustments, amounting to but a fraction of a tenth of a millimeter, may thus cause an excessive or an inadequate pressure. Moreover, in addition to the difficulty of correctly adjusting corrugated diaphragms, their elasticity suffers considerably due to their being exposed to varying temperatures. Furthermore, the excessive movement of such diaphragms tends to weaken the connection between their edges and the annuli, thereby causing leakage.

Diaphragms of relatively smooth, simple, ring-shaped designs have been found preferable when intended to serve as combination seal and resilient support for a movable member within a cylinder head. They provide dependable airtight seals along their inner and outer edges, when pressed against suitable seating ledges arranged in the head and in the movable member by appropriately designed detachable fastening means.

The foregoing features as well as additional objects and advantages of the present invention will become more fully apparent from the ensuing description, reference being had to the accompanying drawing illustrating presently preferred forms for explanatory purposes only, and wherein:

Fig. 1 is a vertical cross sectional view through one embodiment of the present invention, showing the upper portion of a cylinder with a removable cylinder head;

Fig. 2 is an enlarged detail view, shown in section, of a combination sealing and suspension means employed in Fig. 1; and Fig. 3 illustrates a vertical, fragmental cross sectional view through a modified form of our invention.

Referring now more specifically to Figs. 1 and 2, numeral 1 denotes a water-cooled cylinder body of an engine, in which operates a piston 2. Removably secured to the upper end of the cylinder, and sealed against it in the usual manner, is a water-cooled head 3, provided with a port 3' and a fixed valve seat 3'' for a rotary valve member 4. The latter is equipped with a through passage 5, adapted, when the valve is in the position shown in Fig. 1, to register with the interior terminus of port 3' of the head body. Rotary valve 4 is of hollow construction so as to provide passages 6 for circulating a cooling medium therein. The lower portion of valve 4 is seated within movable member 7 provided with a mobile valve seat portion 7' and a port or opening 7''. This movable member is telescopingly arranged within the body of head 3 and is supported within the latter by combination sealing and supporting means indicated at 8. The latter comprise a plurality of superimposed, simple, ring-shaped, dished diaphragms, which are seated with their substantially horizontally flattened ledges against annular ledges 8' and 8'' provided, respectively, in the head body and movable member 7, as clearly seen in Fig. 2. The flattened edges or flanges of the diaphragms are offset in respect to each other at different planes, so that the diaphragms supply the necessary spring tension required of them.

The inner peripheral edge of multiple diaphragm 8 is locked in sealing contact with ledge 8'' by means of an internally threaded ring 9. The outer diaphragm edge is held against ledge 8' by thrust ring 10, which is seated with its lower face against cylinder 1 and is pressed against the latter by the head body. Movable member 7 and rings 9 and 10 completely fill the cavity provided for that member in cylinder head 3, since rings 9 and 10 completely take up the space in the recesses provided for them in the movable member and in the head body respectively. Due to this arrangement the lower surfaces of the rings 9 and 10 are substantially aligned with the lower surface of movable member 7, and form extensions of the latter. Thus a substantially continuous unbroken ceiling for the engine combustion chamber is provided, which is void of any undesired crevices likely to alter the predetermined size or volume of the compression space. The latter, in the design shown in Fig. 1, is necessarily located within the body of the cylinder and below the upper cylinder edge, as indicated at 11. Projecting into this compression chamber is a spark plug 12, also located below the upper cylinder edge.

As stated before, the body of valve 4, as well as the head body and the cylinder walls are arranged to be artificially cooled, for which purpose their structures are hollow. Water legs 13 are indicated in the head structure and spaces 14 are shown in the cylinder. Due to the fact that the bottom end of movable member 7, forming the upper limit of the compression or combustion chamber, coincides with the upper cylinder edge, it becomes necessary, in order to change the compression ratio of the engine, to either elevate or depress the crown of the piston, as the case may be.

Referring again to detail Fig. 2, movable member 7 is sufficiently spaced from the wall of the head cavity to assure its unrestricted movement. Diaphragms 8 are intended to not only hermetically seal the space between movable member 7 and head 3, but are also designed for yieldably supporting member 7 in respect to the head. They exert a sufficient pressure against the movable member to forcibly urge it towards the closed upper end of the head, whereby valve 4 is kept in intimate contact both with its upper fixed seat 3'' within the head and its mobile seat 7' provided in movable member 7. The predetermined pressure exerted by diaphragms 8 is constant while the engine is cold; however it increases slightly when the engine parts are heated when the engine is in operation. This increase in tension is accompanied by a minute travel of the inner edge of the diaphragm in outward direction, due to the expansion of the valve structure following an increase in temperature. This travel is indicated at X in Fig. 2.

Valve 4 is intended to control both the intake as well as the exhaust of cylinder 1. The rotary axis of the valve is disposed parallelly in respect to the crank-shaft of the engine. At least one control valve is provided for one cylinder. In a multiple cylinder engine all the valves are intended to be aligned with each other and their axis of rotation is to be parallel with the axis of rotation of the engine crank-shaft. The amount of pressure exerted by diaphragms 8 against movable member 7 may be readily changed by either decreasing or increasing the number of the diaphragm ring elements, which latter are purposely designed to form smooth and simple structures, adapted to be easily fitted into one another.

In the modified form illustrated in Fig. 3, the underlying principle of the combination sealing and supporting means employed between the head and the movable member remains the same. On the other hand the construction of head 15 is somewhat different in that the cavity 16 provided therein for the reception of movable member 17 is inclined in respect to the upper edge of cylinder 1. In consequence thereof movable member 17 is also inclined, as well as is the combination sealing and supporting means. The latter again consist of a diaphragm 8, composed of a plurality of ring-shaped units, and is seated with its outer peripheral edge against annular ledge 8' recessed in the head body, but wherein thrust ring 10 of Figs. 1 and 2 is replaced by a threaded sleeve 18, engaging a correspondingly threaded portion provided in the cylinder head. The inner edge of diaphragm 8 is held against ledge 8'', provided in movable member 17, by lock ring or nut 9'.

In this construction the bottom face of member 17 is somewhat dished, as indicated at 19, and forms the upper end of combustion chamber 20, now located in the cylinder head. This chamber is of a substantially wedge-shaped cross section. Into the widest or highest portion of the chamber extends the end of ignition means 21 in the form of a removable spark plug. When combustion takes place the ignited gases are forced to travel in the direction from the spark plug towards the steadily diminishing space opposite the spark plug, and thereby grow progressively cooler during their travel. Through the arrangement of the tapered combustion chamber design and the aforesaid location of the spark plug opposite the diminishing area of the chamber, highly beneficial combustion results are obtained. One of the advantages noted is the diminishing of what is known as the "knock" accompanying the explosion of combustion gases. This phenomenon is directly traceable to the fact that the coolest portion of the combusted mixture is at a point farthest away from the spark plug, and this farthest part of combustibles is ignited latest and has diminished in volume.

In reducing the present invention to practice, it has been found that best results are obtained when the thickness of the individual diaphragm members ranges from .05 to .1 per cent of the cylinder diameter, that the combined thickness of the diaphragm members for cylinders having a bore not exceeding 100 mm. should range from between .5 to 1 mm., and for bores not exceeding 150 mm. in diameter the total thickness for the diaphragm members should vary from .5 to 1.5 mm., and that in order to assure the required pressure of the diaphragms against the movable member, their design should allow for a bodily movement ranging from .15 to 2 per cent of the bore diameter.

While in the accompanying drawing only two specific forms of the combined sealing and suspension means are illustrated, the entire control valve structure as well as the structure of said combination means may require alterations and improvements when applied to specific engine designs, and we therefore reserve for ourselves the right to make changes and improvements therein, without departing from the broad scope of our invention, as defined in the annexed claims.

We claim:

1. In a movable sealing instrumentality for rotary valve structures of engines, including a rotary valve operating between fixed and movable working surfaces or seat portions provided respectively in the engine head, and a movable member operative therewithin; annular resilient sealing means connecting the head body with the movable member, and being constructed and arranged to not only seal the space between them, but to forcibly urge the movable member against the head, removable retaining means for fixedly holding the outer and inner peripheral edges of said sealing means against said head body and said movable member respectively; said retaining means and said movable member completely filling the cavity provided for that member in the head body, whereby a continuous unbroken sealing surface for the engine combustion chamber is assured.

2. In a movable sealing instrumentality as set forth in claim 1, said annular sealing means comprising a multiple, ring-shaped dished diaphragm, having flattened peripheral edges disposed in different planes.

3. In a movable sealing instrumentality as set forth in claim 1, said annular sealing means comprising a multiple, ring-shaped dished diaphragm, having substantially horizontally flattened peripheral edges disposed in different planes, annular ledges or seating surfaces provided in said head body and said movable member for accommodating respectively the outer and inner flattened edges of the diaphragm, said retaining means securely holding these flattened edges against their respective seating surfaces so as to provide leakproof connections.

4. In a movable sealing instrumentality as set forth in claim 1, said annular sealing means comprising a plurality of ring-shaped superimposed diaphragms, placed with their outer and inner peripheral edges against coresponding seating surfaces provided in different planes in said head and said movable member, and means for forcing these edges into sealing contact with their respective seating surfaces, the thickness of said diaphragms ranging from .08 to .1 per cent of the diameter of the engine bore.

5. In a movable sealing instrumentality as set forth in claim 1, said annular sealing means comprising a plurality of ring-shaped superimposed diaphragms, placed with their outer and inner peripheral edges against corresponding seating surfaces provided in different planes in said head and said movable member, and means for forcing these edges into sealing contact with their respective seating surfaces, the thickness of said diaphragms ranging from .05 to .1 per cent of the diameter of the engine bore, said diaphragms being so constructed and arranged that their intended bodily movement ranges from .5 to 2 per cent of the engine bore diameter.

6. In a movable sealing instrumentality as set forth in claim 1, said annular sealing means comprising a plurality of ring-shaped superimposed diaphragms, placed with their outer and inner peripheral edges against corresponding seating surfaces provided in different planes in said head and said movable member, and means for forcing these edges into sealing contact with their respective seating surfaces, the thickness of said diaphragms ranging from .05 to .1 per cent of the diameter of the engine bore, said diaphragms being so constructed and arranged that their intended bodily movement ranges from .5 to 2 per cent of the engine bore diameter, the total thickness of said diaphragms for engine bore diameters not exceeding 150 millimeters ranging from .5 to 1.5 millimeters.

7. The combination with a hollow removable head associated with an engine cylinder, and housing a rotary intake and exhaust control valve in bearings having fixed and movable valve seat portions arranged in the head body and in a movable member operative within the head, of a multi-layer ring-shaped resilient diaphragm in sealing contact with said head and said movable member, and so connecting the two instrumentalities as to forcibly urge the movable member against the head, thereby yieldably suspending said member within the head, said diaphragm having outer and inner peripheral flattened flanges, disposed in two planes distanced from one another.

8. The combination as set forth in claim 7, and means for providing said sealing contact and said connection for the diaphragm with the head and the movable member.

9. The combination as set forth in claim 7, and means for providing said sealing contact and said connection for the diaphragm with the head and the movable member, said means consisting of two annuli adapted to press the inner and outer edges of the diaphragm against the bodies of the movable member and of the head, one of the said annuli forming an internally threaded ring in engagement with an external thread provided at the recessed end of the movable member, both annuli completely filling the recesses provided for them so that their exterior or exposed surfaces form an unbroken continuation of the adjoining exposed surface of the movable member, the combined exposed surfaces forming the ceiling for the combustion chamber of the engine cylinder.

10. The combination as set forth in claim 7, and means for providing said sealing contact and said connection for the diaphragm with the head and the movable member, said means consisting of two annuli adapted to press the inner and outer edges of the diaphragm against the bodies of the movable member and of the head, the annulus for the head comprising a ring seated upon the top end of the engine cylinder and being held against the outer edge of diaphragm by the head body, both annuli completely filling the recesses provided for them so that their exterior or exposed surfaces form an unbroken continuation of the adjoining exposed surface of the movable member, the combined exposed surfaces forming the ceiling for the combustion chamber of the engine cylinder.

11. The combination as set forth in claim 7, and means for providing said sealing contact and said connection for the diaphragm with the head and the movable member, said means consisting of two annuli adapted to press the inner and outer edges of the diaphragm against the bodies of the movable member and of the head, the annuli comprising threaded rings engaging correspondingly threaded portions provided in the movable member and the head body, both annuli completely filling the recesses provided for them so that their exterior or exposed surfaces form an unbroken continuation of the adjoining exposed surface of the movable member, the combined exposed surfaces forming the ceiling for the combustion chamber of the engine cylinder.

12. In an engine construction provided with combination sealing and suspension means for a seat member for a rotary valve, a cylinder, a removably mounted head having a closed upper end, a cavity in the head opening towards the cylinder bore, a movable member in said cavity, a rotary intake and exhaust control valve journaled in the head, a fixed valve seat portion provided within the closed head end, a movable valve seat portion arranged in the movable member, a resilient multi-layer ring-shaped diaphragm with offset peripheral, fixedly held flanges yieldably suspending the movable member within the head cavity and forcing it against the fixed valve seat and simultantously sealing the space between the head body and the movable member, diaphragm retaining means holding the diaphragm by its peripheral edges in sealing contact with the head and said movable member, the movable member and said retaining means wholly filling the space above the upper edge of the cylinder to which the head is attached, the exposed surfaces of said retaining means and of said movable member forming continuations of one another in a substantially unbroken plane, and form the ceiling of the combustion chamber, thereby locating the compression space of the engine below the upper cylinder edge, and ignition means provided in the cylinder body below the head.

CHRISTIAN WILHELM PAUL HEYLANDT.
RUDOLF MEWES.
ALBERT POMUTZ.
ALFRED BAER.